(12) United States Patent
Seo et al.

(10) Patent No.: US 10,986,235 B2
(45) Date of Patent: Apr. 20, 2021

(54) HEADSET AND OPERATING METHOD THEREOF

(71) Applicant: LG ELECTRONICS INC., Seoul (KR)

(72) Inventors: Jae Pil Seo, Seoul (KR); Keun Sang Lee, Seoul (KR); Hyeon Sik Choi, Incheon (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/559,043

(22) Filed: Sep. 3, 2019

(65) Prior Publication Data

US 2019/0394339 A1 Dec. 26, 2019

(30) Foreign Application Priority Data

Jul. 23, 2019 (KR) .................. 10-2019-0089121

(51) Int. Cl.
*H04M 9/08* (2006.01)
*H04R 1/10* (2006.01)
*H04R 5/033* (2006.01)

(52) U.S. Cl.
CPC .......... *H04M 9/082* (2013.01); *H04R 1/1083* (2013.01); *H04R 5/0335* (2013.01); *H04R 1/1033* (2013.01); *H04R 2201/107* (2013.01); *H04R 2420/07* (2013.01)

(58) Field of Classification Search
CPC ... H04M 9/082; H04R 1/1083; H04R 1/1033; H04R 5/0335; H04R 2201/107; H04R 2420/07; G10L 25/78; G10L 21/0208; G10L 2021/02082; G10L 2021/02165
See application file for complete search history.

(56) References Cited

U.S. PATENT DOCUMENTS

| | | | | |
|---|---|---|---|---|
| 2007/0021958 | A1* | 1/2007 | Visser ................ | G10L 21/0272 704/226 |
| 2009/0164212 | A1* | 6/2009 | Chan .................. | G10L 21/0208 704/226 |
| 2017/0236528 | A1* | 8/2017 | Lepauloux .......... | G10L 21/0264 704/233 |
| 2019/0272842 | A1* | 9/2019 | Bryan ................. | H04R 1/1083 |

FOREIGN PATENT DOCUMENTS

| KR | 10-2008-0059147 A | 6/2008 |
|---|---|---|
| KR | 10-2013-0042495 A | 4/2013 |
| KR | 10-1590154 B1 | 1/2016 |
| KR | 10-1731714 B1 | 4/2017 |
| KR | 10-1982812 B1 | 5/2019 |

* cited by examiner

*Primary Examiner* — Jason R Kurr
(74) *Attorney, Agent, or Firm* — Birch, Stewart, Kolasch & Birch, LLP

(57) ABSTRACT

Disclosed are a headset and an operating method thereof, which execute a mounted artificial intelligence (AI) algorithm and/or machine learning algorithm and communicate with different electronic apparatuses and external servers in a 5G communication environment. The headset includes a plurality of microphones, an AEC, a VAD, and a BSS, which process sound signals received from the microphones, resulting in improved convenience for a user.

12 Claims, 5 Drawing Sheets

[FIG. 1]
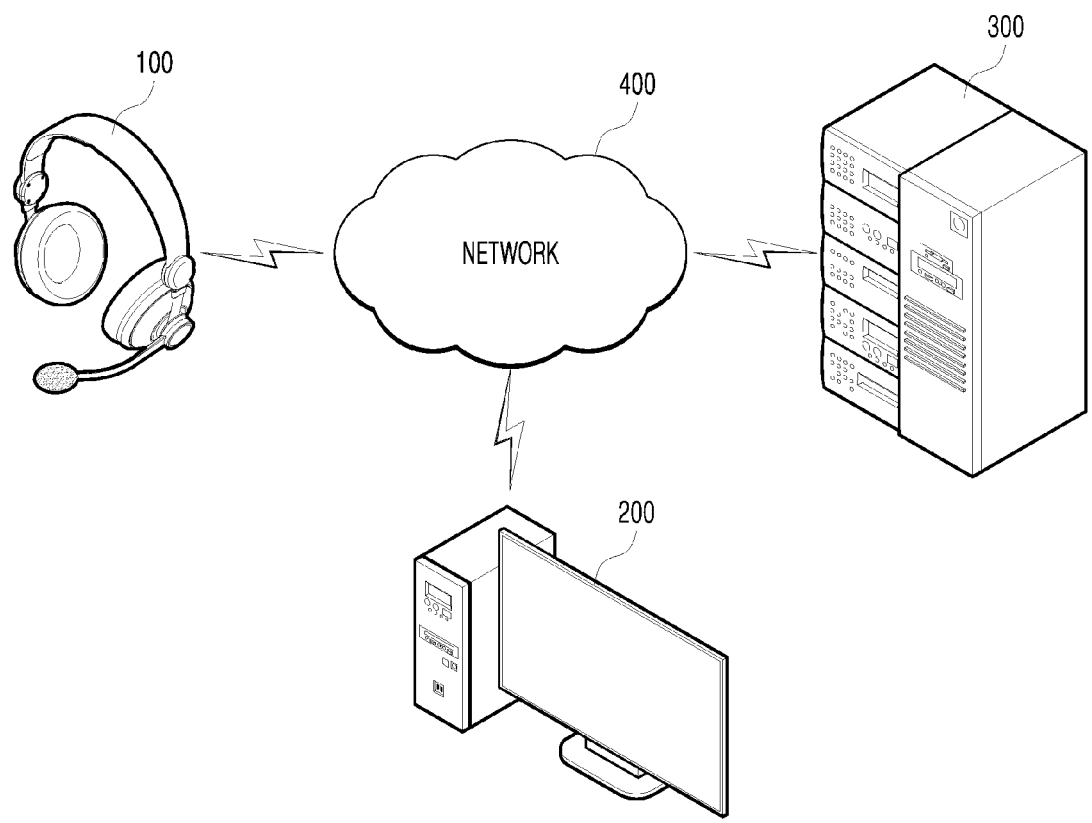

[FIG. 2]
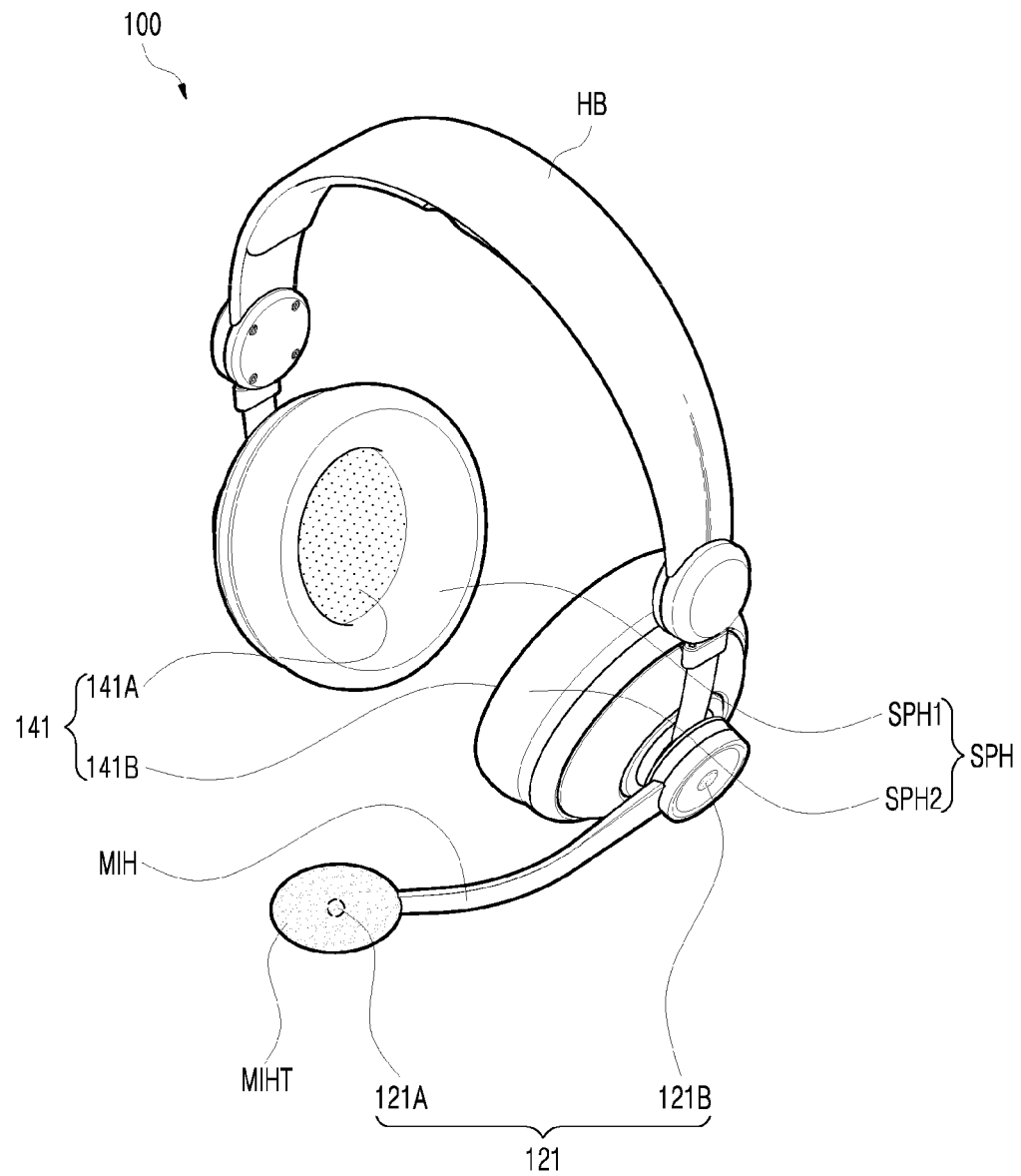

[FIG. 3]
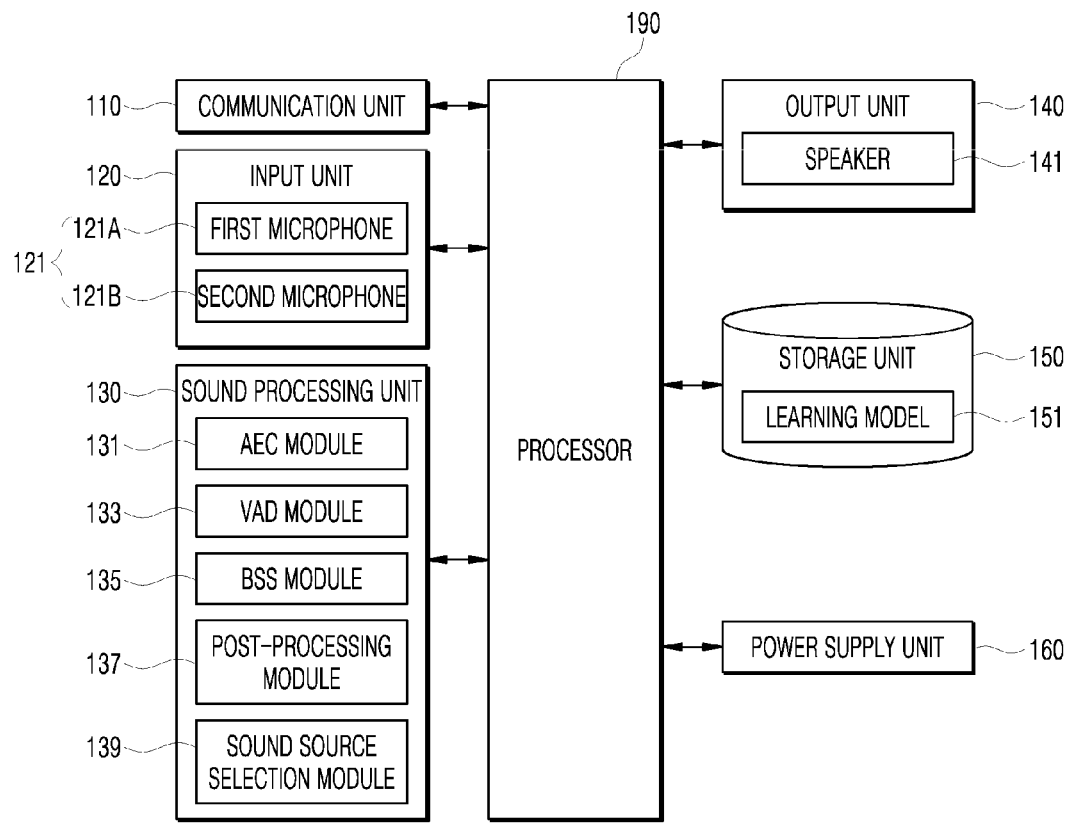
[FIG. 4]
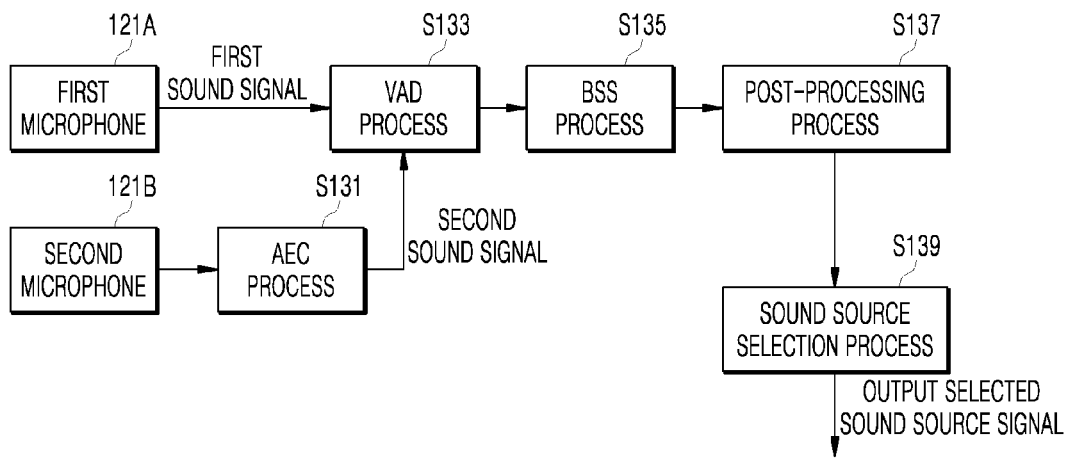

[FIG. 5]
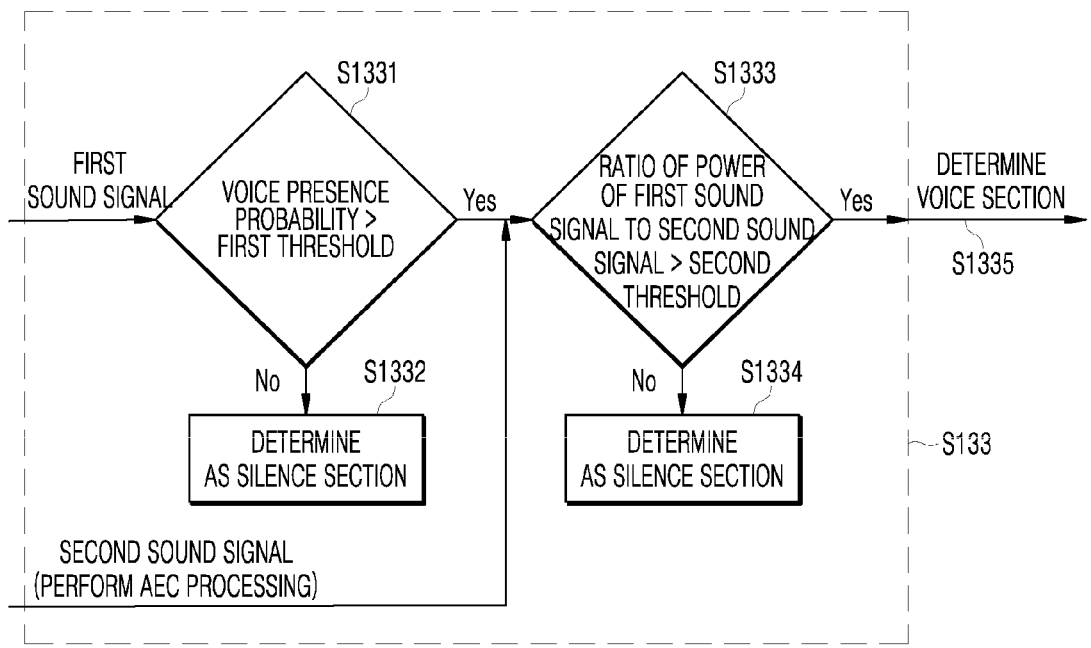

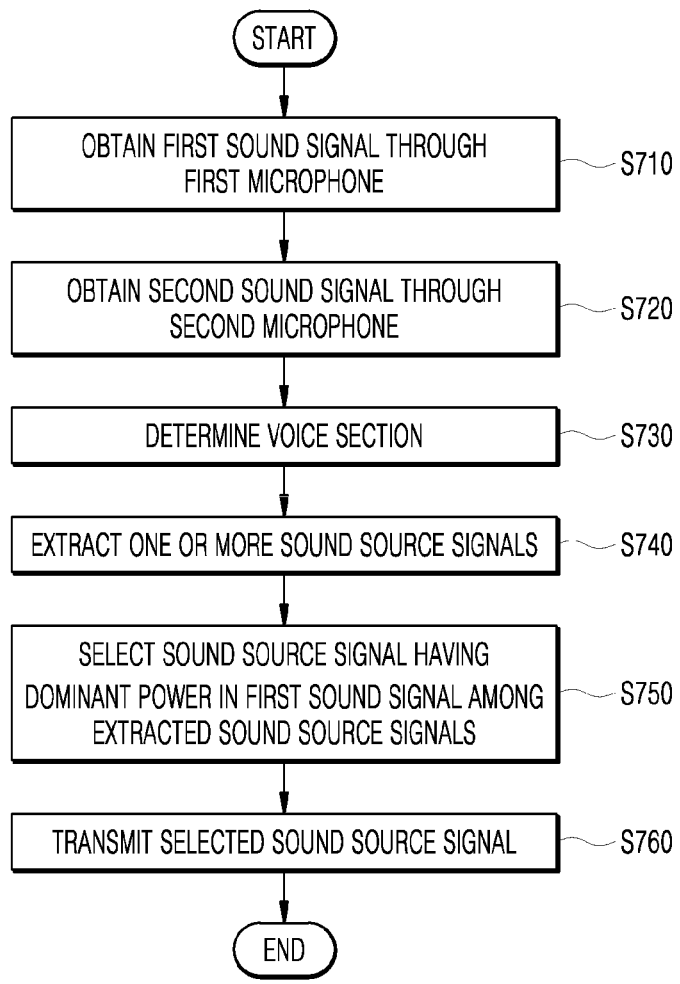
[FIG. 6]

HEADSET AND OPERATING METHOD THEREOF

CROSS-REFERENCE TO RELATED APPLICATION

This present application claims benefit of priority to Korean Patent Application No. 10-2019-0089121, entitled "HEADSET AND OPERATING METHOD THEREOF" and filed on Jul. 23, 2019, in the Korean Intellectual Property Office, the entire disclosure of which is incorporated herein by reference.

BACKGROUND

1. Technical Field

The present disclosure relates to a headset and an operating method thereof, and more particularly, to a headset and an operating method thereof which perform signal processing to improve an utterance quality of an utterer.

2. Description of the Related Art

Generally, a headset has the form of earphones or headphones, and includes two speakers and one microphone. When a headset is used, a user may freely move both hands, resulting in improved convenience for the user.

Headsets are being used in various fields, and are continuously gaining in importance in the field of gaming. When a gamer plays a game, the gamer listens to various sounds through a speaker, and often needs to communicate with other gamers. Therefore, it is important not only to improve the quality of sound outputted through the speaker, but also to improve an utterance quality of utterers.

A hands-free device disclosed in Related Art 1 communicates with a communication terminal, and transmits a recorded spoken utterance to the communication terminal in order to check an utterance quality of the utterer.

However, the hands-free device disclosed in Related Art 1 provides a function of checking a spoken utterance which is manually recorded in order to improve the utterance quality, but does not perform a signal processing method based on a plurality of microphones.

A headset disclosed in Related Art 2 includes a plurality of microphones, and provides a method of attenuating noise which is inputted to a microphone by a beamforming method. Specifically, the headset compensates a magnitude and a phase difference of each frequency between a signal inputted to an in-ear microphone and a signal inputted to an out-ear microphone, and applies it to the out-ear microphone.

However, the headset disclosed in Related Art 2 attenuates noise of the microphone by a beamforming method, and consequently there are limitations in that a slight gain is obtained only in a low frequency band, and the quality of the voice is thus only slightly improved.

SUMMARY OF THE INVENTION

An aspect of the present disclosure is to provide a headset and an operating method thereof which attenuate an output sound signal of a speaker which is inputted to a microphone.

Another aspect of the present disclosure is to provide a headset and an operating method thereof which accurately and precisely extract only a sound of an utterer using a stereo microphone.

Another aspect of the present disclosure is to provide a headset and an operating method thereof which efficiently separate a sound signal having a dominant power.

Aspects of the present invention are not limited to those described above, and other aspects not mentioned above will be obviously understood by those skilled in the art from the description below.

A headset according to an embodiment of the present disclosure includes one or more speakers, a first microphone, a second microphone, an acoustic echo cancellation (AEC) module which attenuates or eliminates an output sound signal of the speaker which is inputted through the second microphone, a voice activity detection (VAD) module which determines a voice section based on a ratio of power of a first sound signal inputted from the first microphone to a second sound signal outputted from the AEC module, a blind source separation (BSS) module which applies a source separation algorithm to the first sound signal and the second sound signal in the determined voice section so as to extract one or more sound source signals, and a sound source selection module which selects, among the extracted sound source signals, a sound source signal having a dominant power in the first sound signal.

The AEC module may update a coefficient value of a first adaptive filter in real time through a least mean square (LMS) algorithm-based machine learning so as to attenuate or eliminate the output sound signal of the speaker.

The VAD module may determine a sound signal section of the first sound signal in which a voice presence probability exceeds a first threshold.

The VAD module may determine, as a voice section, a sound signal section of the determined sound signal section in which a ratio of power of the first sound signal with respect to the second sound signal exceeds a second threshold.

The BSS module may set a cost function such that respective sound signals inputted from different sound sources become independent signal components, and update a coefficient value of a second adaptive filter through the machine learning in real time based on the set cost function, so as to extract one or more sound source signals in the determined voice section.

The first microphone of the headset may be disposed to be closer to an utterance point of an utterer wearing the headset than the second microphone, the second microphone may be disposed to be closer to a speaker outputting a sound signal than the first microphone, and the second microphone may be disposed in a predetermined area of a band which connects the speakers.

The headset may further include a post-processing module which eliminates residual noise included in the sound source signal extracted by the BSS module, and equalizes the sound source signal.

An operating method of a headset according to another embodiment of the present disclosure includes obtaining a first sound signal through a first microphone, obtaining a second sound signal obtained by attenuating or eliminating an output sound signal of a speaker from a sound signal inputted through a second microphone, determining a voice section based on a ratio of power of the first sound signal to the second sound signal, extracting one or more sound source signals by applying a source separation algorithm to the first sound signal and the second sound signal in the determined voice section, and selecting, among the extracted sound source signals, a sound source signal having a dominant power in the first sound signal.

The obtaining a second sound signal may include updating a coefficient value of a first adaptive filter in real time through a least mean square (LMS) algorithm-based machine learning so as to attenuate or eliminate the output sound signal of the speaker.

The determining a voice section may include determining a sound signal section of the first sound signal in which a voice presence probability exceeds a first threshold, and determining, as the voice section a sound signal section of the determined sound signal section in which a ratio of power of the first sound signal with respect to the second sound signal exceeds a second threshold.

The extracting of a sound source signal may include setting a cost function such that respective sound signals inputted from different sound sources become independent signal components, and updating a coefficient value of a second adaptive filter through the machine learning in real time based on the set cost function, so as to extract one or more sound source signals in the determined voice section.

The operating method of a headset may further include eliminating a residual noise included in the extracted sound source signal and equalizing the sound source signal.

Embodiments of the present invention are not limited to those described above, and other embodiments not mentioned above will be obviously understood by those skilled in the art from the description below.

According to various embodiments of the present disclosure, the following effects can be derived.

First, by attenuating an output sound signal of a speaker which is inputted to a microphone, utterance quality of an utterer may be improved, resulting in improved convenience for the user.

Second, by delicately extracting only the sound of the utterer and providing an improved sound quality to a listener, convenience of the user may be improved.

BRIEF DESCRIPTION OF THE DRAWINGS

The above and other aspects, features, and advantages of the present disclosure will become apparent from the detailed description of the following aspects in conjunction with the accompanying drawings, in which:

FIG. 1 is a schematic view illustrating a network environment in which a headset, a computer, and a system according to an embodiment of the present disclosure are connected to each other;

FIG. 2 is a view illustrating a structure of a headset according to an embodiment of the present disclosure;

FIG. 3 is a block diagram illustrating a configuration of a headset according to an embodiment of the present disclosure;

FIG. 4 is a view illustrating an overall operation flow of a headset which effectively selects a voice of an utterer according to an embodiment of the present disclosure;

FIG. 5 is a view illustrating a VAD process illustrated in FIG. 4 in more detail; and FIG. 6 is a sequence diagram illustrating an operating method of a headset according to an embodiment of the present disclosure.

DETAILED DESCRIPTION

Advantages and features of the present disclosure and methods of achieving the advantages and features will be more apparent with reference to the following detailed description of example embodiments in connection with the accompanying drawings. However, the description of particular example embodiments is not intended to limit the present disclosure to the particular example embodiments disclosed herein, but on the contrary, it should be understood that the present disclosure is to cover all modifications, equivalents and alternatives falling within the spirit and scope of the present disclosure. The example embodiments disclosed below are provided so that the present disclosure will be thorough and complete, and also to provide a more complete understanding of the scope of the present disclosure to those of ordinary skill in the art. In the interest of clarity, not all details of the relevant art are described in detail in the present specification in so much as such details are not necessary to obtain a complete understanding of the present disclosure.

The terminology used herein is used for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof. Furthermore, the terms such as "first," "second," and other numerical terms may be used herein only to describe various elements, but these elements should not be limited by these terms. Furthermore, these terms such as "first," "second," and other numerical terms, are used only to distinguish one element from another element.

As used herein, the term "and/or" includes any and all combinations of one or more of the associated listed items. The terms "connected" and "coupled" are not restricted to physical or mechanical connections or couplings, and can include electrical connections or couplings, whether direct or indirect. The connection can be such that the objects are permanently connected or releasably connected.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

Hereinbelow, the example embodiments of the present disclosure will be described in greater detail with reference to the accompanying drawings, and on all these accompanying drawings, the identical or analogous elements are designated by the same reference numeral, and repeated description of the common elements will be omitted. It should be understood that the embodiments are illustrative, and should not be construed as being limiting in any way.

FIG. 1 is a schematic view for explaining an environment in which a headset 100, a computer 200, and an external system 300 according to an embodiment of the present disclosure are connected to each other through a network 400.

The headset 100 refers to headphones including a microphone, and provides convenience to a user by allowing both hands of the user to be free during voice chatting and during an Internet phone call. The headset 100 may have various forms, including a head band type, a neck band type, and an ear set, and may communicate with devices through wire or wirelessly.

Further, although the headset 100 may have various specifications, a headset which is connected to a computer may have a stronger output intensity than other headphones.

The computer 200 may be directly connected to the headset 100 through wire, or wirelessly connected to the headset 100 through a network 400 (for example, a short range network). Depending on the embodiment, the computer 200 may be a mobile device such as a portable phone, a smart phone, a laptop computer, a digital broadcasting terminal, a personal digital assistant (PDA), a portable multimedia player (PMP), a navigation, a slate PC, a tablet PC, an Ultrabook, and a wearable device (for example, a smartwatch, smart glasses, and a HMD (head mounted display)), and a fixed device such as a digital TV, a desktop computer, and a digital signage.

Further, the computer 200 may communicate with an external device or an external system 300 using a communication module, through the network 400. The computer 200 may transmit various sound signals received from the headset 100 to the external device or the external system 300, and transmit a sound signal received from the external device or the external system 300 to the headset 100. As a selective or additional embodiment, the headset 100 may be implemented to directly communicate with the external device and the external system 300.

All of the headset 100, the computer 200, and the external system 300 are mounted with a 5G module, and may thereby transmit and receive data at a speed of 100 Mbps to 20 Gbps (or higher) and transmit large video files to various devices, and may be driven with low power so that the power consumption may be reduced.

The external system 300 which provides various functions may include various types of servers and systems capable of communicating. The network 400 may be a mobile communication network, a short range network, and the Internet, and thereby provide a communication environment of the devices through wire or wirelessly.

Hereinafter, a structure and a configuration of the headset 100 will be described with reference to FIGS. 2 and 3. FIG. 2 is a view illustrating a structure of a headset 100 according to an embodiment of the present disclosure, and FIG. 3 is a block diagram illustrating a configuration of a headset 100 according to an embodiment of the present disclosure.

Referring to FIG. 2, the headset 100 may include a plurality of speaker housings SPH (SPH1 and SPH2). The speaker housing SPH may include a speaker 141 (141A and 141B) therein, and may be formed to expose a part of the speaker 141. A head band HB may be disposed between the speaker housings SPH1 and SPH2.

A second microphone 121B may be exposed to the outside of the second speaker housing SPH2, and a microphone housing MIH may be disposed in a direction extending from the second speaker housing SPH2 to the outside.

An end of the microphone housing MIH may be disposed to be close to a mouth of the utterer. The first microphone 121A may be disposed in an area at the end of the microphone housing MIH, and a wired cable may be disposed in the microphone housing MIH in order to transmit a signal of the first microphone 121A.

Depending on the embodiment, a structure MIHT such as a sponge or rubber which prevents attachment of foreign matter may be disposed to prevent the foreign matter from becoming attached to the first microphone 121A and to prevent an impact from being applied thereto.

The headset 100 is described as including a plurality of microphones 121A and 121B, and may thus be said to include a stereo microphone. In a selective embodiment, further microphones may be further included. In this case, as will be described below, the number of separable sound sources may be increased.

The first microphone 121A may be disposed around an uttering point (for example, a mouth) of the utterer, so as to be disposed closer to the uttering point than the second microphone 121B. The second microphone 121B may be disposed in the vicinity of the ear of the utterer. Therefore, the second microphone may be disposed to be closer to a second speaker 141B outputting a sound signal.

In a selective embodiment, the second microphone 121B may be disposed in a predetermined area of the head band HB so that the distance between the second microphone 121B and the second speaker 141B is further increased, so as to effectively attenuate an output sound signal of the speaker 141B.

Referring to FIG. 3, the headset 100 may include a communication unit 110, an input unit 120, a sound processing unit 130, an output unit 140, a storage unit 150, a power supply unit 160, and a processor 190. However, the components illustrated in FIG. 3 are not essential for implementing the headset 100, and the headset 100 described in this specification may include more components or fewer components than the above-described components.

First, the communication unit 110 is a module which performs communication between the headset 100 and one or more communication devices. When the headset 100 is disposed in a general home, the headset 100 may configure a home network together with various communication devices (for example, a computer 200, a refrigerator, an internet protocol television (IPTV), a Bluetooth® speaker, an artificial intelligence (AI) speaker, or a mobile terminal).

The communication unit 110 may include a mobile communication module and a short range communication module. First, the mobile communication module may transmit and receive wireless signals to and from at least one among a base station, an external terminal, and a server on a mobile communication network constructed in accordance with technical standards or communication schemes for mobile communication (for example, global system for mobile communication (GSM), code division multi access (CDMA), CDMA2000, enhanced voice-data optimized or enhanced voice-data only (EV-DO), wideband CDMA (WCDMA), high speed downlink packet access (HSDPA), high speed uplink packet access (HSUPA), long term evolution (LTE), long term evolution advanced (LTE-A), or 5G (fifth generation)). Further, the communication unit 110 may include a short range communication module. Here, the short-range communication module may support short-range communication by using at least one of Bluetooth®, radio frequency identification (RFID), infrared data association (IrDA), ultra wideband (UWB), ZigBee, near field communication (NFC), Wireless-Fidelity (Wi-Fi), Wi-Fi Direct, and wireless universal serial bus (USB) technologies.

Further, the communication unit 110 may support various kinds of object intelligence communications (such as Internet of things (IoT), Internet of everything (IoE), and Internet of small things (IoST)) and may support communications such as machine to machine (M2M) communication, vehicle to everything communication (V2X), and device to device (D2D) communication.

The input unit 120 may include a camera or an image input unit which inputs an image signal, a microphone 121 or an audio input unit which inputs an audio signal, and a user input unit (for example, a touch key or a mechanical key) which receives information from a user. Here, the microphone 121 may be implemented by two or more microphones, and in the present specification it is assumed that the microphone 121 includes a first microphone 121A and a second microphone 121B.

In a selective or additional embodiment, the headset 100 may further include a sensing unit. The sensing unit may collect various information using various sensors.

The sound processing unit 130 is a module which performs processing related to sound in accordance with the control of the processor 190, and in some embodiments, the sound processing unit may be implemented to be included in the processor 190 and implemented by one chip.

The sound processing unit 130 may include modules such as an acoustic echo canceller (AEC) 131, a voice activity detector (VAD) 133, a blind source separator (BSS) 135, a post-processor 137, and a sound source selector 139. In addition, the sound processing unit 130 may further include an analog to digital converter (ADC) which converts a sound into a digital sound signal, and a digital to analog converter (DAC) which converts a digital sound signal into sound.

The AEC 131 is a module which attenuates or eliminates an output sound signal of the second speaker 141B or external noises which are inputted to the second microphone 121B. The AEC may eliminate echoes, and determine a speaker sound signal as a noise so as to attenuate or eliminate the speaker sound signal.

When not only an output sound signal of the second speaker 141B, but also an output sound signal of the first speaker 141A is inputted to the second microphone 121B, the AEC 131 may determine the corresponding speaker sound signal as a noise, and attenuate or eliminate the speaker sound signal.

Therefore, the speaker sound signal may be attenuated or eliminated to prevent howling, and furthermore the speaker sound signal is not transmitted to an interlocutor of the utterer. Accordingly, convenience of the user may be improved.

Hereinafter, the AEC processing will be described in detail.

The AEC 131 may generate a least mean square which minimizes an error signal (a difference between a desired signal and an actual signal) through a least mean square (LMS) algorithm in real time. Accordingly, the AEC 131 may update a coefficient value of an adaptive filter (a first adaptive filter) based on machine learning in real time, so as to attenuate or eliminate the output sound signal of the speaker.

Specifically, the AEC 131 may estimate an acoustic path through which a sound signal (mainly outputted by the second speaker 141B) of the speaker enters the second microphone 121B through an original sound (reference) of the speaker sound signal and the first adaptive filter, and the first adaptive filter may be updated by finding an optimal value through the machine learning in real time.

By doing this, the AEC 131 may attenuate or eliminate a speaker sound signal (a noise signal) from sound signals of utterers (including an utterer wearing the headset 100 and other utterers) inputted from the second microphone 121B.

In a selective embodiment, when the second microphone 121B is disposed in an area (for example, a predetermined area of the head band HB) which minimizes an input of an output sound signal of the speaker, the AEC 131 may more effectively attenuate or eliminate the output sound signal of the speaker.

In a selective or additional embodiment, the AEC 131 may adaptively set a coefficient value of the first adaptive filter using a learning model 151 required for machine learning stored in the storage unit 150. That is, the AEC 131 may find a coefficient of the first adaptive filter which may effectively attenuate the output sound signal of the speaker by comprehensively considering, for example, a sex, an utterance characteristic (such as a volume and a voice pitch) of the utterer, and external noise.

The VAD 133 is a module which separates an utterance section and a silence section of the voice, and may determine a voice section based on a ratio of power of a first sound signal input from the first microphone 121A and a second sound signal output from the AEC 131.

Here, a plurality of microphones 121 of the headset 100 is provided so that the VAD 133 may clearly distinguish the voice section of the utterer wearing the headset 100, which will be described in more detail with reference to FIGS. 4 and 5.

Since the BSS 135 does not need information on a source of each signal, it is called a blind source separation method. The BSS 135 may extract one or more sound source signals by applying a source separation algorithm to the first sound signal and the second sound signal during the determined voice section.

Specifically, by generating a separated signal by multiplying signals mixed with a non-mixed matrix of weights, the BSS 135 may add the non-mixed matrix of weights to mixed signals. In the matrix, the weights are allocated initial values, and may be adjusted to minimize information redundancy. The redundancy may be repeated until the redundancy of the information of the sound signal is reduced to a minimum. Here, the number of separable sound sources may be determined in accordance with the number of microphones, but the embodiment is not limited thereto. The operation of the BSS 135 will be described in more detail with reference to FIGS. 4 and 5.

The post-processor 137 may eliminate residual noise and equalize sound source signals separated in the BSS 135.

The sound source selector 139 may select a sound source signal extracted from the BSS 135 or a sound source signal having a dominant power in the first sound signal after performing the processing by the post-processor 137.

That is, since the power of an utterer voice inputted through the first microphone 121A, which is closer to the mouth of the utterer, is more dominant than the power of an utterer voice inputted through the microphone 121B, which is farther from the mouth of the utterer, the sound source selector 139 may select a sound source signal having a dominant power in the first sound signal (a sound signal inputted through the first microphone 121A).

The output unit 140 is provided to generate outputs related to vision, auditory sense, or tactile sense, and may include at least one among a display, one or more light emitting diodes, a speaker 141, and a haptic module. The speaker 141 may be implemented as a plurality of speakers 141A and 141B so as to correspond to left and right ears of the utterer.

The storage unit 150 stores data which supports various functions of the headset 100. The storage unit 150 may store a plurality of application programs (or applications) driven in the headset 100, data for operations of the headset 100, and commands.

Further, the storage unit 150 may store information required to perform an operation using artificial intelligence, machine learning, and an artificial neural network. In the present specification, it is assumed that the sound processing unit 130 or the processor 190 autonomously performs the machine learning or an artificial neural network operation using learning models (for example, a learning model for adaptively setting a coefficient of the first adaptive filter to perform the AEC function, or a learning model for adaptively setting a coefficient of a second adaptive filter based on a predetermined cost function to perform a blind source separation (BSS) function) which perform the machine learning stored in the storage unit 150. Therefore, it is possible to precisely and accurately separate the voice section of the utterer by eliminating external noises, without using an external device of the headset 100. A selective embodiment may also be implemented such that the computer (200 in FIG. 1) or the external system (300 in FIG. 1) performs the artificial intelligence, the machine learning, and the artificial neural network operation, and the headset 100 uses the operation result.

Hereinafter, artificial intelligence, machine learning, and artificial neural network will be described for reference. Artificial intelligence (AI) is an area of computer engineering science and information technology that studies methods to make computers mimic intelligent human behaviors such as reasoning, learning, self-improving, and the like.

Machine learning is an area of artificial intelligence that includes the field of study that gives computers the capability to learn without being explicitly programmed. More specifically, machine learning is a technology that investigates and builds systems, and algorithms for such systems, which are capable of learning, making predictions, and enhancing their own performance on the basis of experiential data. Machine learning algorithms, rather than only executing rigidly set static program commands, may be used to take an approach that builds models for deriving predictions and decisions from input data.

Numerous machine learning algorithms have been developed for data classification in machine learning. Representative examples of such machine learning algorithms for data classification include a decision tree, a Bayesian network, a support vector machine (SVM), an artificial neural network (ANN), and so forth.

An ANN is a data processing system modelled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science.

Specifically, ANNs may refer generally to models that have artificial neurons (nodes) forming a network through synaptic interconnections, and acquire problem-solving capability as the strengths of synaptic interconnections are adjusted throughout training. The terms 'artificial neural network' and 'neural network' may be used interchangeably herein.

An ANN may include a number of layers, each including a number of neurons. Furthermore, the ANN may include synapses that connect the neurons to one another.

An ANN may be defined by the following three factors: (1) a connection pattern between neurons on different layers; (2) a learning process that updates synaptic weights; and (3) an activation function generating an output value from a weighted sum of inputs received from a previous layer.

ANNs include, but are not limited to, network models such as a deep neural network (DNN), a recurrent neural network (RNN), a bidirectional recurrent deep neural network (BRDNN), a multilayer perception (MLP), and a convolutional neural network (CNN).

An ANN may be classified as a single-layer neural network or a multi-layer neural network, based on the number of layers therein. In general, a single-layer neural network may include an input layer and an output layer. In general, a multi-layer neural network may include an input layer, one or more hidden layers, and an output layer.

The input layer receives data from an external source, and the number of neurons in the input layer is identical to the number of input variables. The hidden layer is located between the input layer and the output layer, and receives signals from the input layer, extracts features, and feeds the extracted features to the output layer. The output layer receives a signal from the hidden layer and outputs an output value based on the received signal. Input signals between the neurons are summed together after being multiplied by corresponding connection strengths (synaptic weights). Optionally, a bias may be additionally summed, and if this sum exceeds a threshold value of a corresponding neuron, the neuron can be activated and output an output value obtained through an activation function.

Meanwhile, a deep neural network with a plurality of hidden layers between the input layer and the output layer may be the most representative type of artificial neural network which enables deep learning, which is one machine learning technique.

An ANN can be trained using training data. Here, the training may refer to the process of determining parameters of the artificial neural network by using the training data, to perform tasks such as classification, regression analysis, and clustering of input data. Such parameters of the artificial neural network may include synaptic weights and biases applied to neurons.

An artificial neural network trained using training data can classify or cluster input data according to a pattern within the input data. Throughout the present specification, an artificial neural network trained using training data may be referred to as a trained model.

Hereinbelow, learning paradigms of an artificial neural network will be described in detail. Learning paradigms, in which an artificial neural network operates, may be classified into supervised learning, unsupervised learning, semi-supervised learning, and reinforcement learning.

Supervised learning is a machine learning method that derives a single function from the training data. Among the functions that may be thus derived, a function that outputs a continuous range of values may be referred to as a regressor, and a function that predicts and outputs the class of an input vector may be referred to as a classifier. In supervised learning, an artificial neural network can be trained with training data that has been given a label.

Here, the label may refer to a target answer (or a result value) to be guessed by the artificial neural network when the training data is input to the artificial neural network. Throughout the present specification, the target answer (or a result value) to be guessed by the artificial neural network when the training data is input may be referred to as a label or labeling data. Throughout the present specification, assigning one or more labels to training data in order to train an artificial neural network may be referred to as labeling the training data with labeling data. Training data and labels corresponding to the training data together may form a single training set, and as such, they may be input to an artificial neural network as a training set.

Meanwhile, the training data may exhibit a number of features, and the training data being labeled with the labels may be interpreted as the features exhibited by the training data being labeled with the labels. In this case, the training data may represent a feature of an input object as a vector.

Using training data and labeling data together, the artificial neural network may derive a correlation function between the training data and the labeling data. Then, through evaluation of the function derived from the artificial neural network, a parameter of the artificial neural network may be determined (optimized).

Unsupervised learning is a machine learning method that learns from training data that has not been given a label.

More specifically, unsupervised learning may be a training scheme that trains an artificial neural network to discover a pattern within given training data and perform classification by using the discovered pattern, rather than by using a correlation between given training data and labels corresponding to the given training data. Examples of unsupervised learning include, but are not limited to, clustering and independent component analysis. Examples of artificial neural networks using unsupervised learning include, but are not limited to, a generative adversarial network (GAN) and an autoencoder (AE).

GAN is a machine learning method in which two different artificial intelligences, a generator and a discriminator, improve performance through competing with each other. The generator may be a model generating new data that generates new data based on true data.

The discriminator may be a model recognizing patterns in data that determines whether input data is from the true data or from the new data generated by the generator. Furthermore, the generator may receive and learn from data that has failed to fool the discriminator, while the discriminator may receive and learn from data that has succeeded in fooling the generator. Accordingly, the generator may evolve so as to fool the discriminator as effectively as possible, while the discriminator evolves so as to distinguish, as effectively as possible, between the true data and the data generated by the generator.

An auto-encoder (AE) is a neural network which aims to reconstruct its input as output.

More specifically, AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data output from the hidden layer may be input to the output layer. Given that the number of nodes in the output layer is greater than the number of nodes in the hidden layer, the dimensionality of the data increases, thus leading to data decompression or decoding.

Furthermore, in the AE, the input data is represented as hidden layer data as interneuron connection strengths are adjusted through training. The fact that when representing information, the hidden layer is able to reconstruct the input data as output by using fewer neurons than the input layer may indicate that the hidden layer has discovered a hidden pattern in the input data and is using the discovered hidden pattern to represent the information.

Semi-supervised learning is a machine learning method that makes use of both labeled training data and unlabeled training data.

Semi-supervised learning is one of the techniques which is to deduce labels of unlabeled training data and then perform leaning using the deduced labels. This technique may be used advantageously when the cost associated with the labeling process is high.

Reinforcement learning may be based on a theory that given the condition under which a reinforcement learning agent can determine what action to choose at each time instance, the agent can find an optimal path to a solution solely based on experience without reference to data.

Reinforcement learning may be performed mainly through a Markov decision process.

Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

Also, the hyperparameters are set before learning, and model parameters can be set through learning to specify the architecture of the artificial neural network by the configuration of the model, the activation function, the loss function or the cost function, the learning argorithm, the optimization algorithm, or the like.

For instance, the structure of an artificial neural network may be determined by a number of factors, including the number of hidden layers, the number of hidden nodes included in each hidden layer, input feature vectors, target feature vectors, and so forth.

Hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an artificial neural network. Learning in the artificial neural network involves a process of adjusting model parameters so as to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a loss function, and examples of such learning optimization algorithms include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the value of a loss function by using a current slope of the loss function.

The direction in which the model parameters are to be adjusted may be referred to as a step direction, and a size by which the model parameters are to be adjusted may be referred to as a step size.

Here, the step size may mean a learning rate.

GD may obtain a slope of the loss function through use of partial differential equations, using each of model parameters, and updates the model parameters by adjusting the model parameters by a learning rate in the direction of the obtained slope.

SGD may include a method that separates the training data into mini-batches, and by performing gradient descent for each of these mini-batches, increases the frequency of gradient descent.

Adagrad, AdaDelta and RMSProp may include methods that increase optimization accuracy in SGD by adjusting the step size, and may also include methods that increase optimization accuracy by adjusting the momentum in SGD and step direction in NAG. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network rely not only on the structure and the kinds of learning optimization algorithms of the artificial neural network but also on the hyperparameters thereof. Therefore, in order to obtain a good learning model, it is important to choose a proper structure and learning algorithms for the artificial neural network, but also to choose proper hyperparameters.

In general, the artificial neural network is first trained by experimentally setting hyperparameters to various values, and based on the results of training, the hyperparameters can be set to optimal values that provide a stable learning rate and accuracy.

Referring back to FIG. 2, the storage unit 150 may store information necessary when the sound processing unit 130, which will be described below, processes and selects a sound signal.

The power supply unit 160 receives external power and internal power to supply the power to each component of the headset 100, under the control of the processor 190. The power supply unit 160 includes a battery, and the battery may be an embedded battery or a replaceable battery. The battery is charged by a wired or wireless charging method, and the wireless charging method may include a self-induction method or a magnetic resonance method.

The processor 190 is a module which controls the components of the headset 100. The processor 190 may refer to a data processing device embedded in hardware, which has a physically configured circuit in order to perform a function expressed by a code or a command included in a program. Examples of the data processing device embedded in hardware include, but are not limited to, processing devices such as a microprocessor, a central processing unit (CPU), a processor core, a multiprocessor, an application-specific integrated circuit (ASIC), a field programmable gate array (FPGA), and the like.

Hereinafter, an operation method of the headset 100 according to various embodiments of the present disclosure will be described with reference to FIGS. 4 and 6.

FIG. 4 is a view illustrating an overall operation flow of a headset 100 which effectively selects a voice of an utterer according to an embodiment of the present disclosure. FIG. 5 is a view illustrating a VAD process illustrated in FIG. 4 in more detail.

First, in a VAD process S133, a first sound signal inputted from the first microphone 121A, and a second sound signal outputted through an AEC process S131 among sound signals inputted through the second microphone 121B, may be inputted. The AEC process S131 is a process performed by the AEC 131 of the headset 100, of which a specific operation has been described above. Accordingly, description of the AEC process S131 will be omitted.

The VAD process S133 will now be described with reference to FIG. 5. First, when a voice presence probability of the first sound signal inputted from the first microphone 121A exceeds a first threshold TH, the VAD 133 may initially determine this as a sound signal section in step S1331. When the voice presence probability is equal to or lower than the first threshold, the section may be determined as a silence section in step S1332.

Here, the voice presence probability may be set as a percentage, and may be set to 60% to 70% based on the detection precision, but the embodiment is not limited thereto. The voice presence probability may be calculated by (voice distribution ratio)/(voice signal+noise signal), and may be an estimated signal to noise ratio (SNR).

When the voice presence probability exceeds the first threshold, the VAD 133 may determine whether a ratio of power of the first sound signal to the second sound signal exceeds a second threshold in step S1333.

Here, if the voices are the same voice of the utterer, the VAD 133 may measure the power of the first sound signal inputted through the first microphone 121A, which is close to the mouth of the utterer, as being larger than the power of the second sound signal (on which AEC processing is performed) inputted through the second microphone 121B. Here the power of the first sound signal may be two times to three times higher than the second signal, or higher. Specifically, when the utterer is immersed in a game or a video, the power of the first sound signal may be several times higher than that of the second sound signal due to the Lombard effect.

In step S1335, the VAD 133 may determine a voice section based on a ratio of power of the sound signals as described above. When the second threshold is represented by dB, if a strength of the power is two times higher, the second threshold may be represented by 6 dB, but it may be set differently depending on the situation in the embodiment. The VAD 133 may determine the voice section through the VAD process S133 and provide the voice section to the BSS 135.

The BSS process S135 is a process performed by the BSS 135 of the headset 100. In the BSS process S135 the plurality of sound signals are separated for each sound source.

Since the BSS 135 does not need information on a sound source of each signal, sound source signals may be extracted based on the number of microphones by performing a blind source separation method.

In the case of the voice of the same utterer, since the power of the first sound signal inputted from the first microphone 121A is stronger than that of the second sound signal, the BSS 135 separates the first sound signal as a first sound source signal and the remaining signals as second sound source signals. That is, when two microphones are provided, the first sound signal may be separated as a first sound source signal and the remaining sound signal other than the first sound signal may be separated as the second sound source signal. When the number of microphones is increased, the number of separable sound source signals may be increased in proportion to the number of microphones.

The BSS 135 may extract a plurality of sound source signals by applying a source separation algorithm to the first sound signal and the second sound signal in the determined voice section.

The BSS 135 may perform a source separation algorithm which updates a coefficient value of the second adaptive filter which minimizes a covariance between sound source signals (when the covariance is zero, two sound source signals are independent components) in real time. The BSS 135 may update the coefficient value of the adaptive filter through machine learning in real time so that the sound source signals become independent sound source components. Here, the adaptive filter is referred to as a second adaptive filter so as to distinguish the second adaptive filter from the first adaptive filter of the AEC 131.

After determining a cost function, the BSS 135 may find a target optimized value using a gradient descent method which finds a target value. The process of finding an optimized value is a process of finding a coefficient value of the second adaptive filter. The BSS 135 may update the coefficient value of the second adaptive filter in real time until the sound source signals become independent sound source components in real time.

The BSS 135 may provide sound source signals for each of the plurality of sound sources of the first sound signal and the second sound signal to the post-processing process S137, and the post-processing process S137 may be performed by the post-processor 137.

The post-processor 137 may eliminate the residual noise and perform an equalizing function so as to improve a sound quality. When the equalizing is performed, the sound quality may be set and improved in accordance with the situation (conversation, singing, or wearing the headset 100 for a long time) of the utterer.

Finally, in the sound source selection process S139, a sound source signal which has a dominant power in the first sound signal may be selected from the plurality of extracted sound source signals. In this case, the headset 100 may more clearly, accurately, and precisely select the voice of the utterer, and provide the voice to the computer (200 in FIG. 1) and external devices.

FIG. 6 is a sequence diagram illustrating an operating method of a headset 100 according to an embodiment of the present disclosure.

First, the headset 100 obtains a first sound signal through the first microphone 121A in step S710.

Here, the first microphone 121A may be disposed in the vicinity of the mouth of the utterer.

The headset 100 obtains a sound signal through the second microphone in step S720.

Here, the AEC 131 may obtain a sound signal through the second microphone, eliminate a noise signal of the speaker to process a second sound signal, and provide the second sound signal to a next process.

Specifically, the headset 100 may update a coefficient value of the first adaptive filter in real time through a least mean square (LMS) algorithm-based machine learning so as to attenuate or eliminate the output sound signal of the speaker.

The orders of step S710 and step S720 may be switched.

The headset 100 determines a voice section in step S730.

Specifically, the headset 100 may determine a voice section based on a ratio of power of the first sound signal to the second sound signal.

Here, in step S730, a sound signal section in which a voice presence probability exceeds a first threshold may be determined from the first sound signal, and a sound signal section in the determined sound signal section in which the ratio of power of the first sound signal with respect to the second sound signal exceeds the second threshold may be determined as a voice section.

The voice presence probability may be set as a percentage, and a first threshold may be set by a value between 0 and 1. When the value of the first threshold is too high or too low, it may be difficult to determine the voice section, and thus an appropriate first threshold needs to be set by experiment.

After step S730, in step S740, the headset 100 applies a source separation algorithm to the first sound signal and the second sound signal in the determined voice section so as to extract one or more sound source signals.

Specifically, the headset 100 determines a cost function such that respective sound signals inputted from different sound sources become independent signal components, and updates the coefficient value of the second adaptive filter through machine learning in real time, based on the set cost function, so as to extract one or more sound source signals in the determined voice section.

Before step S750, the headset 100 may eliminate the residual noise of the extracted sound source signal and equalize the sound source signal. In some embodiments, the step may be performed after selecting the sound source signal.

In step S750, the headset 100 selects a sound source signal having a dominant power in the first sound signal among the extracted sound source signals.

Therefore, a voice which is inputted from a microphone (first microphone), which is close to the mouth of the utterer, may be selected.

By doing this, the headset 100 may transmit the selected sound source signal to the computer or the external device in step S760. When the headset 100 is connected to the computer through wire, the sound source signal may be transmitted through wired communication.

In the present specification, it is assumed that signals such as the sound signal and the sound source signal do not refer to signals for one period, but may broadly include a signal included in a predetermined time period.

The present disclosure described above may be implemented as a computer-readable code in a medium on which a program is written. The computer readable medium includes all types of recording devices in which data readable by a computer system can be stored. Examples of the computer readable medium include a hard disk drive (HDD), a solid state disk (SSD), a silicon disk drive (SDD), a read-only memory (ROM), a random-access memory (RAM), CD-ROM, a magnetic tape, a floppy disk, an optical data storage device, and the like. Further, the computer may include the processor 190 of the headset 100.

Although specific embodiments of the present disclosure have been described and illustrated above, the present disclosure is not limited to the described embodiments, and it will be understood by those skilled in the art that the present may be modified and changed in various specific embodiments without departing from the spirit and the scope of the present disclosure. Therefore, the scope of the present disclosure is thus not limited to the example embodiments described above, and rather intended to include the following appended claims, and all modifications, equivalents, and alternatives falling within the spirit and scope of the following claims.

What is claimed is:

1. A headset, comprising:
   one or more speakers;
   a first microphone;
   a second microphone;
   an acoustic echo canceller (AEC) which attenuates or eliminates an output sound signal of the speaker which is input through the second microphone;

a voice activity detector (VAD) which determines a voice section based on a ratio of power of a first sound signal input from the first microphone to a second sound signal output from the AEC;

a blind source separator (BSS) which applies a source separation algorithm to the first sound signal and the second sound signal in the determined voice section so as to extract one or more sound source signals; and a sound source selector which selects, among the extracted sound source signals, a sound source signal having a dominant power in the first sound signal, wherein the VAD determines a sound signal section of the first sound signal in which a voice presence probability exceeds a first threshold.

2. The headset according to claim 1, wherein the AEC updates a coefficient value of a first adaptive filter in real time through a least mean square (LMS) algorithm-based machine learning so as to attenuate or eliminate the output sound signal of the speaker.

3. The headset according to claim 1, wherein the VAD determines, as the voice section, a sound signal section of the determined sound signal section in which the ratio of power of the first sound signal with respect to the second sound signal exceeds a second threshold.

4. The headset according to claim 3; wherein the BSS sets a cost function such that respective sound signals input from different sound sources become independent signal components, and updates a coefficient value of a second adaptive filter through machine learning in real time based on the set cost function, so as to extract one or more sound source signals in the determined voice section.

5. The headset according to claim 1, wherein the first microphone is disposed to be closer to an utterance point of an utterer wearing the headset than the second microphone, and the second microphone is disposed to be closer to the speaker outputting a sound signal than the first microphone.

6. The headset according to claim 1, wherein the second microphone is disposed in a predetermined area of a band which connects the speakers.

7. The headset according to claim 1, further comprising a post-processor which eliminates residual noise included in the sound source signal extracted by the BSS, and equalizes the sound source signal.

8. An operating method of a headset, the method comprising:

obtaining a first sound signal through a first microphone;

obtaining a second sound signal obtained by attenuating or eliminating an output sound signal of a speaker from a sound signal input through a second microphone;

determining a voice section based on a ratio of power of the first sound signal to the second sound signal;

extracting one or more sound source signals by applying a source separation algorithm to the first sound signal and the second sound signal in the determined voice section; and selecting, among the extracted sound source signals, a sound source signal having a dominant power in the first sound signal, wherein the determining the voice section includes determining a sound signal section of the first sound signal in which a voice presence probability exceeds a first threshold.

9. The operating method according to claim 8, wherein the obtaining the second sound signal includes updating a coefficient value of a first adaptive filter in real time through a least mean square (LMS) algorithm-based machine learning so as to attenuate or eliminate the output sound signal of the speaker.

10. The operating method according to claim 8, wherein the determining the voice section includes determining, as the voice section, a sound signal section of the determined sound signal section in which the ratio of power of the first sound signal with respect to the second sound signal exceeds a second threshold.

11. The operating method according to claim 10, wherein the extracting the sound source signal includes setting a cost function such that respective sound signals input from different sound sources become independent signal components, and updating a coefficient value of a second adaptive filter through machine learning in real time based on the set cost function, so as to extract one or more sound source signals in the determined voice section.

12. The operating method according to claim 11, further comprising eliminating a residual noise included in the extracted sound source signal and equalizing the sound source signal.

* * * * *